Sept. 21, 1926.

W. M. KNIGHT

SAFETY CLUTCH

Filed Jan. 31, 1925

INVENTOR.
WILLIS M. KNIGHT
BY
ATTORNEY.

Sept. 21, 1926.  W. M. KNIGHT  1,600,477
SAFETY CLUTCH
Filed Jan. 31, 1925    2 Sheets-Sheet 2
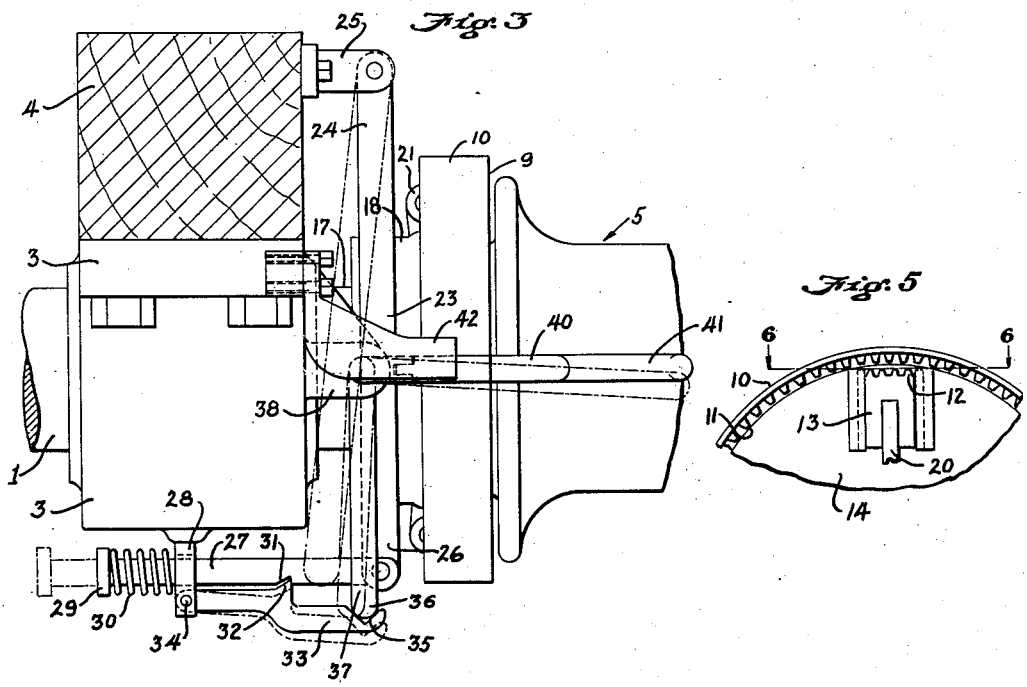
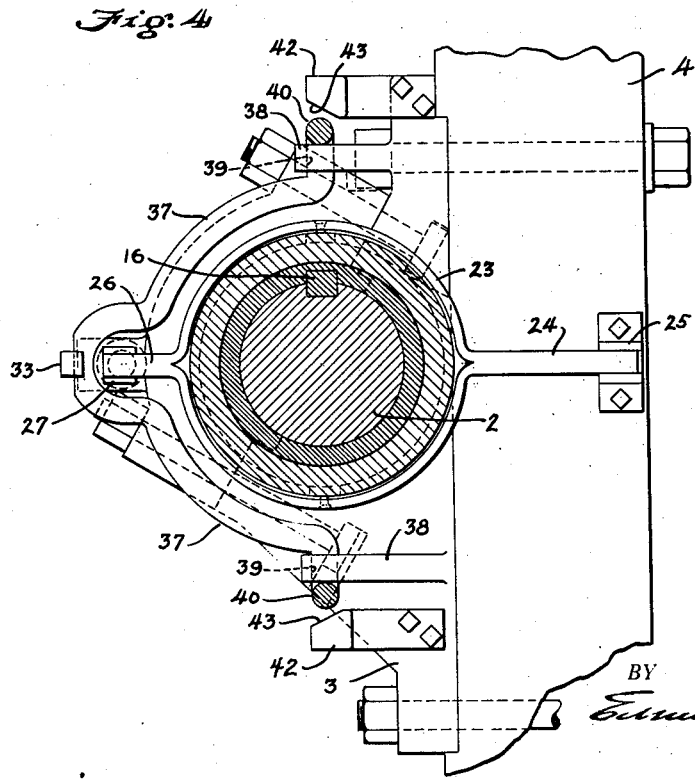
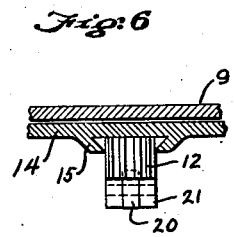
INVENTOR.
WILLIS M. KNIGHT
BY
ATTORNEY.

Patented Sept. 21, 1926.

1,600,477

UNITED STATES PATENT OFFICE.

WILLIS MERLE KNIGHT, OF LONG BEACH, CALIFORNIA.

SAFETY CLUTCH.

Application filed January 31, 1925. Serial No. 6,010.

This invention relates more particularly to a clutch mechanism designed to be used in connection with cat heads of hoists of drawworks employed in the drilling of oil wells by the rotary method.

An important object of the invention is to provide a safety clutch mechanism for the "cathead" driving shaft of an oil well drawworks designed to automatically disengage the "cathead" from driving engagement with its shaft should the cat line pile or cord up, or foreign objects become entangled therewith.

A further object of the invention is to provide a drawworks of the class described with clutch mechanism connecting the cathead and drive shaft, which is not only automatically releasable, but which may be also manually actuated at any time by the operator.

Another object is to provide a mechanism having the most logical disposition of parts in order to obtain simplicity of construction and operation without decreasing its efficiency or increasing its cost of manufacture or maintenance.

The above objects are accomplished by means of the mechanism hereinafter described, and illustrated in the accompanying drawings in which:

Fig. 3 is a detail plan view of the clutch operating mechanism.

Fig. 4 is a vertical section taken on the line 4—4 of Fig. 2.

Fig. 5 is a fragmentary detail showing parts of the interlocking mechanism of the clutch.

Fig. 6 is a horizontal section on the line 6—6 of Fig. 5.

Figure 1:
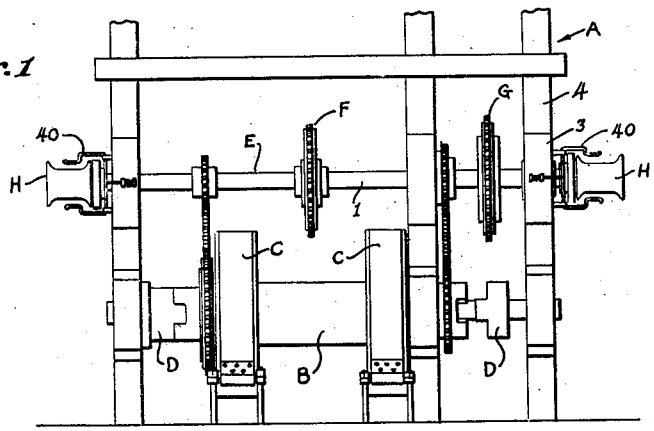
Fig. 1 is a front elevation of an oil well drilling drawworks of usual form.

The invention is designed to be employed with the well known "drawworks" mechanism employed in rotary oil well drilling, said drawworks comprising a framework "A" formed of timbering. In the lower portion of the drawworks is disposed a cable drum "B", all of usual construction. Disposed directly above the cable drum is a line shaft "E," which is in driving connection with the cable drum, a spocket gear "F" being geared to an engine or other prime mover (not shown). The line shaft is also provided with a sprocket gear "G" which is in driving connection with the gearing for rotating the rotary table of the drilling outfit. Each of the ends of the line shaft are provided with catheads "H", to which my invention is applied.

Since the catheads and clutch mechanism on opposite sides of the line shaft are identical, only one will be described.

As shown in the drawing, the line shaft 1 has an end 2 projecting through a bearing 3 of the usual type suitably secured to a standard 4. A cathead or snubbing drum 5 is rotatably mounted on the end 2 and is bored to form a shoulder 7 coacting with a retaining plate 8 suitably secured to the end 2 of shaft 1, the parts being sized and arranged to permit free rotation of the cathead on shaft 1 while preventing sliding movement lengthwise thereof.

A flanged clutch plate 9 is secured to the inner end of cathead 5 to rotate therewith, and has the inner side of its flange 10 provided with teeth 11 adapted to mesh with corresponding teeth 12 on slides 13 which are slidably and radially movable of the clutch plate 14 in the guides 15 formed thereon.

The clutch plate 14 is fixed to rotate with shaft 1 as by key 16, and has a hub 17 extending rearwardly to bearing 3. A sleeve 18 is mounted to slide on hub 17 and is provided with lugs 19 each having pivoted thereto one end of a link 20 pivotally connected to a lug 21 formed on one of the slides 13.

The sleeve 18 is provided with an annular slot or groove 22 adapted to receive slidably a pin 22' extending from a yoke 23 which surrounds said sleeve 18 and has an arm 24 extending radially therefrom to form a pivot connection with a support 25 on standard 4. Extending diametrically opposite to the arm 24 on yoke 23 is an arm 26 to which is pivoted one end of a rod 27 slidably arranged in a support 28 secured to the bearing 3.

The rod 27 is provided with a head 29 between which and support 28 is arranged a coil spring 30 compressed normally to force rod 27 with yoke 23 toward the bearing 3, and thereby maintain the teeth 11 and 12 of the respective clutch members 10 and 13 normally disengaged. The rod 27 is also provided with a notch 31 adapted to receive a projection 32 formed intermediate the ends of a pawl member 33 having one end thereof pivoted as at 34 to support 28 and having at its free end a V-shaped notch 35 adapted to receive the free end 36 of a clutch releasing yoke 37.

The releasing yoke 37 is pivoted vertically in lugs 38 extending from bearing 3, and is provided with parts 39 extending at right angles to the plane of the yoke proper. To each of the parts 39 there is pivoted to swing vertically a rod 40 having a part thereof bent to form an operating arm 41 spaced from and extending lengthwise of and parallel to the periphery of cathead 5.

A cam member 42 having a cam face 43 is secured to bearing 3 in position to engage the rod 40 when the latter is raised from the cathead 5, either manually or by engagement with any obstruction on the cathead, and is arranged to cause rotation of the yoke 37 about its vertical pivots when the rod 40 slides over said cam face. From the drawing it clearly appears that this rotation of yoke 37 moves pawl 33 out of locking engagement with rod 27 to effect automatic release of the clutch mechanism.

The operating arm 41 is intended to be spaced from the periphery of the cathead at a distance slightly greater than the thickness of one line, so that the piling or cording up of more than one thickness of the line, or the entanglement of anything therein will immediately move the arm to release the clutch mechanism.

Figure 2:
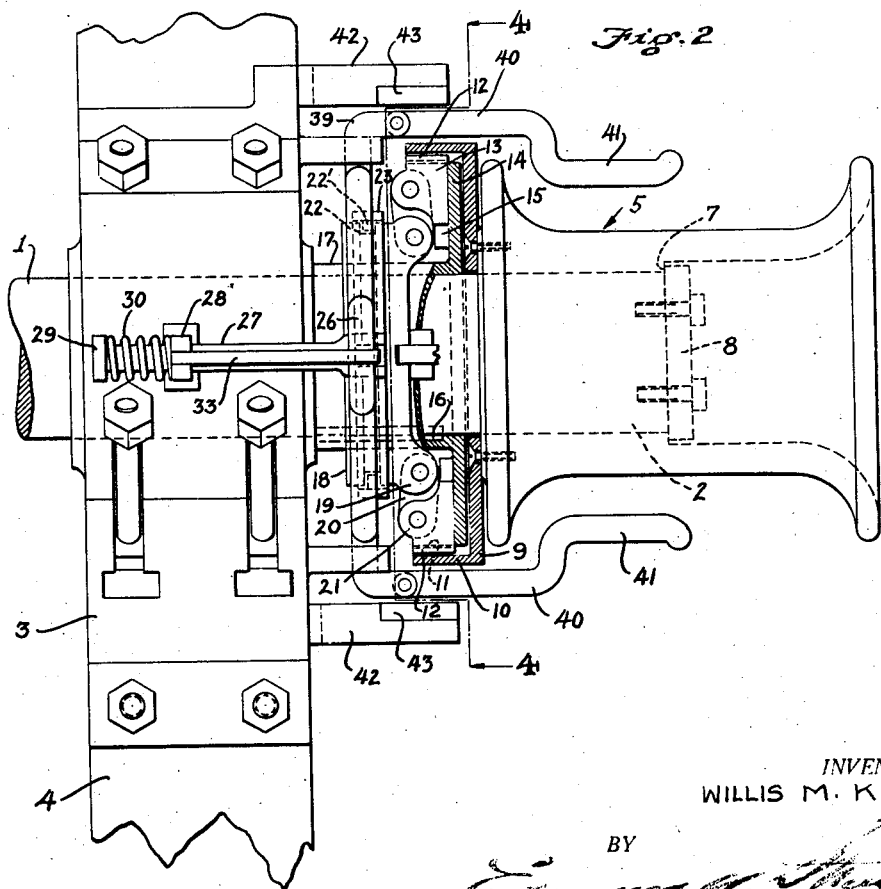
Fig. 2 is an enlarged detail elevation of the "cathead" and clutching mechanism, parts being in section to more clearly disclose the construction.

Assuming the parts to be arranged as shown in Figs. 2, 3, 4, of the drawings, with the clutch mechanism locked to cause rotation of the cathead with the line shaft, and assuming that the rod 41 is spaced from the periphery of the cathead at a distance less than two thicknesses of the line, it is obvious that when the line piles or cords up, one strand or another, or when anything becomes entangled in the line, either or both of rods 41 will be rotated about their horizontal pivots, and their parts 40 impinging against cam faces 43, will cause the yoke 37 to rotate about its vertical pivots. This rotation of yoke 37 disengage pawl 33 from rod 27, which will then be forced rearwardly by spring 30, thereby pivoting yoke 23 to slide sleeve 18 rearwardly and effect release of the clutch members. This clutch release permits the cathead to rotate freely on, instead of fixedly with, the line shaft, and to stop of its own inertia, or to be stopped independently of the line shaft or driving power. When unlocked, the cathead may be locked to the line shaft by merely pushing in rod 27 against the pressure of spring 30 and seating the projection 32 of pawl 33 in notch 31 on the rod 27.

It is obvious that the rods 41 may be actuated manually to release the clutch mechanism when anything goes wrong with the tongs or other apparatus attached to the catline, without the operators being compelled to throw the engine throttle, which may be at some distance from them.

The clutch releasing action is quick and positive, since all the clutch-locking teeth have an angle which gives them a tendency to disengage as soon as the toggle links pass the center line of thrust, and the spring is strong and highly compressed to cause the clutch elements to separate quickly when released. The releasing levers in no way interfere with the working or handling of the snubbing drum and line, as they are arranged adjacent the top and bottom of the drum, while the line winds onto and comes off the drum horizontally.

What I claim is:

1. A safety clutch mechanism comprising a support, a shaft rotatably mounted thereon, a drum rotatable on said shaft, a clutch for releasably locking said shaft to said drum, trip mechanism for holding said clutch in locking position, a yoke pivoted to said support and having a part thereof connected to said trip mechanism, an arm extending at right angles to said yoke, a rod pivoted to said arm and extending over said drum, and means on said support adapted to engage said rod when so moved by an obstruction on said drum to move said yoke and operate said mechanism to release said clutch.

2. A safety clutch mechanism comprising a driving shaft, a drum rotatable thereon, a clutch for releasably locking said drum to said shaft, trip mechanism for holding said clutch in locking position, a bellcrank yoke lever having an arm extending over said drum, and means engageable with said arm for moving said yoke in one direction while the arm is moved in a direction at right angles thereto by engagement with an obstruction on said drum.

3. A safety clutch mechanism comprising a driving shaft, a drum rotatable thereon, a clutch for releasably locking said drum to said shaft, means for yieldingly holding said clutch in locked position, a pivoted yoke connected to said trip and having a plurality of arms pivoted thereto and extending over opposite sides of said drum, and means engageable with said pivoted arms when moved away from said drum to move said yoke and thereby release said trip.

4. A safety clutch mechanism comprising a driving shaft, a drum rotatable thereon, means for releasably locking said drum to said shaft, means extending over said drum and adapted by engagement with an obstruction thereon to be moved away from said drum in a radial direction with respect thereto, a cam engageable by said means when the latter is given said radial movement to deflect said arm, and means operated by the deflection of said arm to release said locking means.

5. A safety clutch mechanism comprising a driving shaft, a drum rotatable thereon, means for releasably locking said drum to said shaft, an arm extending over said drum, a part to which said arm is pivoted to swing radially with respect to said drum, said part moving with said arm when the latter is deflected from its radial movement, a cam in the path of radial movement of said arm to cause deflection of said arm, and means operatively connected with said part to release said locking means.

In witness that I claim the foregoing I have hereunto subscribed my name this 16th day of January, 1925.

WILLIS MERLE KNIGHT.